(12) United States Patent
Lortz

(10) Patent No.: US 6,505,243 B1
(45) Date of Patent: Jan. 7, 2003

(54) AUTOMATIC WEB-BASED DETECTION AND DISPLAY OF PRODUCT INSTALLATION HELP INFORMATION

(75) Inventor: Victor Lortz, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/324,532

(22) Filed: Jun. 2, 1999

(51) Int. Cl.[7] ............................................. G06F 15/177
(52) U.S. Cl. ................................... 709/220; 345/705
(58) Field of Search .............................. 709/220, 221, 709/222, 233; 345/705, 708, 714

(56) References Cited

U.S. PATENT DOCUMENTS

| | | | | |
|---|---|---|---|---|
| 5,881,236 A | * | 3/1999 | Dickey | 395/200.51 |
| 5,958,007 A | * | 9/1999 | Lee et al. | 709/219 |
| 6,012,088 A | * | 1/2000 | Li et al. | 709/219 |
| 6,012,100 A | * | 1/2000 | Frailong et al. | 709/250 |
| 6,161,133 A | * | 12/2000 | Kikinis | 709/220 |
| 6,170,026 B1 | * | 1/2001 | Kimura et al. | 710/62 |
| 6,178,468 B1 | * | 1/2001 | Rudd et al. | 710/8 |
| 2001/0044839 A1 | * | 11/2001 | Bourke-Dunphy et al. | 709/222 |
| 2002/0055988 A1 | * | 5/2002 | Crooks | 709/220 |

* cited by examiner

Primary Examiner—Dung C. Dinh
Assistant Examiner—Isaac Woo
(74) Attorney, Agent, or Firm—Steven D. Yates

(57) ABSTRACT

The invention provides device-specific help information, such as help, warranty, configuration, installation information, etc., for network-attachable devices. After a connection notification from a network-attachable device is received over a first data path, device-specific help information for the network-attachable device is retrieved. This device-specific help information is then provided to a configuration interface, thus facilitating installation, configuration and customization of the device.

36 Claims, 5 Drawing Sheets

AUTOMATIC WEB-BASED DETECTION AND DISPLAY OF PRODUCT INSTALLATION HELP INFORMATION

FIELD OF THE INVENTION

The invention relates to the field of networking. In particular, the invention relates to automatically retrieving installation instructions, including, for example, configuration data from local and remote locations for devices attached to a network, so as to assist in the installation (configuration) of such devices.

GLOSSARY

As used herein, the term network is intended to generally reference Local Area Networks, Wide Area Networking, or other combinations of communicative devices, networking backbone topologies and formats. The term protocol is intended to be a general reference to traditional Ethernet protocols such as TCP/IP (Transmission Control Protocol over Internet Protocol), ICMP (the Internet Control Message Protocol extension to TCP/IP), IPX (Internetwork Packet exchange), SPX (Sequenced Packet Exchange), and the AppleTalk networking protocols used by Apple Computer systems. And the term device means a general reference to a computing device or computer program (executing on a computing device) that requests (e.g., acts as a client) or provides services (e.g., acts as a server) to another device. Devices take on the role of client or server, depending on circumstances. Devices communicate according to a protocol, which may be a message based protocol.

Over time, networks have moved from being the sole province of universities and large corporations, to being an essential element of business workplaces. This progression is due, in part, to decreased equipment costs and adoption of interoperability standards. But, these standards have not eliminated the complexity associated with installation and configuration of network equipment (e.g., network backbones and network-aware devices).

Installation issues can be alleviated by hiring information technology (IT) specialists trained to implement and support network technology. However, this solution is not usually viable in non-commercial (e.g., home) contexts, or in Small Office Home Office (SOHO) environments, as these environments typically cannot afford to retain IT staff. For example, although dropping computer prices have made it practical to have several computers at home, networking complexities make it difficult to take advantage of resource-sharing by networking devices together.

What is needed, then, is a way to automatically provide support for home and SOHO users seeking to network together various network-aware devices, without their having to consult with specialists.

SUMMARY

A system and method for providing device-specific help information for a network-attachable device. A connection notification is received for the network-attachable device over a first data path. Device-specific help information is retrieved for the network-attachable device over a second data path. And, device-specific help information is provided to a configuration interface.

DETAILED DESCRIPTION

A networking system designed in accordance with the following figures and description allows networking products to be shipped with little or no installation instructions. This allows one to avoid designing product literature that must second-guess all likely installation environments, and provide installation instructions for each. As discussed below, one can provide targeted help, at a level specific to a particular installer's needs, for a particular installation environment. There is no longer a risk of losing or damaging installation media.

Figure 1:
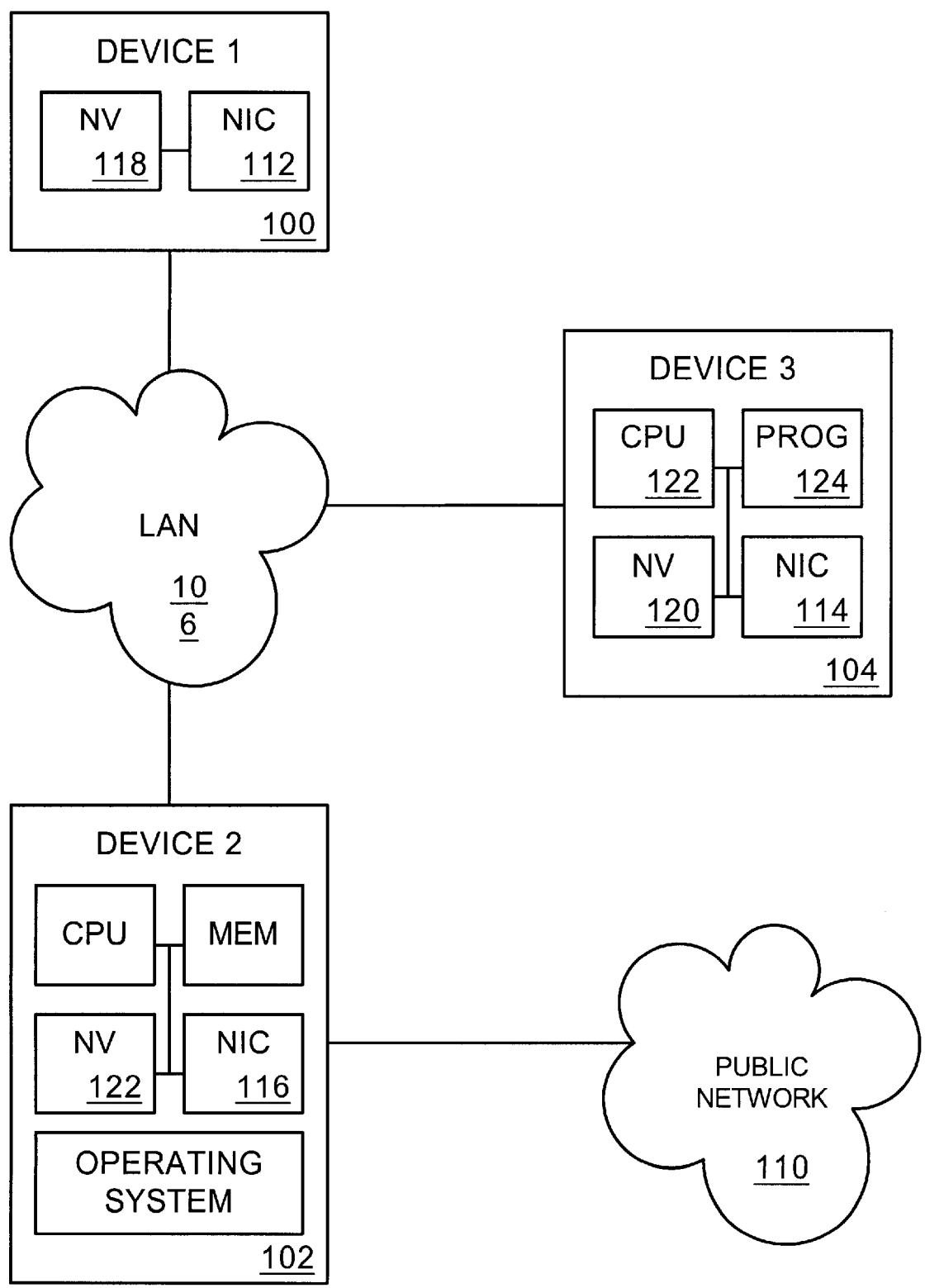
FIG. 1 illustrates a typical networking configuration.

FIG. 1 illustrates a typical networking configuration. As shown, there are three network-attachable devices 100, 102, 104, that have been connected to a network 106. It will be understood that there can be many network devices attached to network 106; as shown, network 106 can be a local area network (LAN) cloud comprising multiple different LAN topologies. Such topologies include wireless (satellite, television (TV), infrared, microwave, Radio Frequency, etc.), and wired cabling (e.g., optical, coaxial, telephone, electrical, etc.) that can be joined together to form a single logical network 106. A recent trend, in the SOHO and home markets, is a focus on telephone and electrical wiring as the network backbone. The ubiquitous nature of such wiring aids their popularity.

Devices 100, 102, 104 can be any combination of traditional and non-traditional networking devices. Traditional devices include computing devices, such as computers, as well as programmed (or re-programmable) digital processors, network printers, and the like. Traditional devices include those networking devices usually found installed within an Ethernet, AppleTalk, Token Ring or other networking topology.

Non-traditional devices, however, include those types of device not usually found attached to a network, or are usually found in a proprietary closed-network. Such devices include lighting equipment (e.g., a light bulb), alarm equipment, sensors, doors, motors, temperature gauges, household appliances, telephones, etc. To network such non-traditional devices, the traditional device is augmented with networking functionality.

A minimal configuration for such augmented devices includes a network interface 112, 114, 116 to enable communication with the network 106, and a memory 118, 120, 122 (e.g., non-volatile RAM) for storing persistent configuration information such as a time zone identifier, state information, or configuration selections. It is assumed that all devices referenced herein contain at least a minimal configuration, and that minimal configurations contains sufficient basic logic (perhaps embedded in the network interface) to boot the device, establish a connection with the network, and communicate with a configuring device for configuration assistance.

For example, assume device 2 102 is a computer responsible for configuring minimally configured devices. On installation of minimally configured device 1 into the network 106, the computer 102 (e.g., device 2) "recognizes" attachment of device 1 and contacts the device to configure it. Attachment may be physically recognized, e.g., by a pin or line being drawn to ground, or logically recognized by a broadcast message by the device when it is attached to the network 106. Note that more than one configuring device may be present on the network, and an arbitration system is used to identify a responsible configuring device. Selection of a responsible configuring device can be made according to device characteristics, workload of configuring devices, proximity to the newly attached device, etc.

Thus, an exemplary minimally-configured device needing configuration assistance is a light bulb. A light bulb's restricted space to place networking structure 112, 118, e.g., in its base, making it a likely candidate for minimal configuration. (However, it will be appreciated that advances in microelectronics can change its candidacy.) When a minimally configured device such as the exemplary light bulb is attached to a network, per its basic logic, the device acquires a network address. (Note that an atypical networking scheme can be used where addresses are pre-assigned to all devices.)

Address acquisition may be accomplished through assignment of an address by the configuring device 102, (e.g., as by a Dynamic Host Configuration Protocol (DHCP) server for a TCP/IP network, or by self-assignment. Self-addressing can be accomplished by broadcasting to the network 106 an intent to use a particular device address. (Self-assignment presumes all devices use addresses from a predetermined pool, with no subnet issues.) If no response is received to the intent to use notification, then the address is deemed available. (Note that one or more devices may respond on behalf of temporarily disconnected devices.)

The configuring device 102 is then responsible for coordinating activities of the minimally configured device, e.g., in the context of a light bulb, telling the bulb when to turn on, off, dim, etc. Alternatively, after configuring the device, control is passed off to one or more other devices. For example, after the light bulb is established in the network, control of the light can be passed to a light switch, room sensor, etc. (A switch can be assigned several light bulbs to activate in response to use of the switch's controls. And a sensor, if it detects movement, can direct the light bulb to turn on.)

In addition to minimally configured devices, there can be more complex devices having greater capabilities. For example, device 3 104 includes a processor 122 and operating program 124 in addition to the requisite network interface 114 and configuration memory 120. (Not shown is a program memory, e.g., RAM, ROM, PROM, etc., storing the operating program.) The operating program can include additional functionality to allow the device to independently operate without resort to a configuring device 102. The operating program may include functionality allowing the device can negotiate for its own address, install itself into the network without aid from a configuring device, as well as obtain control of other devices. For example, device 3 104 may be a light switch for controlling the light bulb. (See FIG. 3 discussion.)

As shown, all devices 100, 102, 104 are in communication with the LAN cloud 106. However, some devices may also be in communication with other networks. For example, device 102 is shown as having a link to a public network 110. This network can be the Internet or other network. Device 102 may therefore be providing bridging or routing services. In such topologies, network 104 is considered to be an intra-network, while the second network is considered to be a public-network (e.g., an Internet).

One example a network 104 designed to support traditional and non-traditional devices is one implementing the Consumer Electronic Bus (CEBus) network protocol created by the Electronic Industries Association (and others over time). The CEBus protocol implements a standard that defines how devices can inter-communicate over the network 106. For the remaining discussion, it is assumed that network 106 operates under the CEBus standard, however any network protocol/environment may be used. (For more information on the CEBus protocol, see the CEBus Standard User's Guide by Grayson Evans (The Training Department Publications, 1996).)

Figure 2:
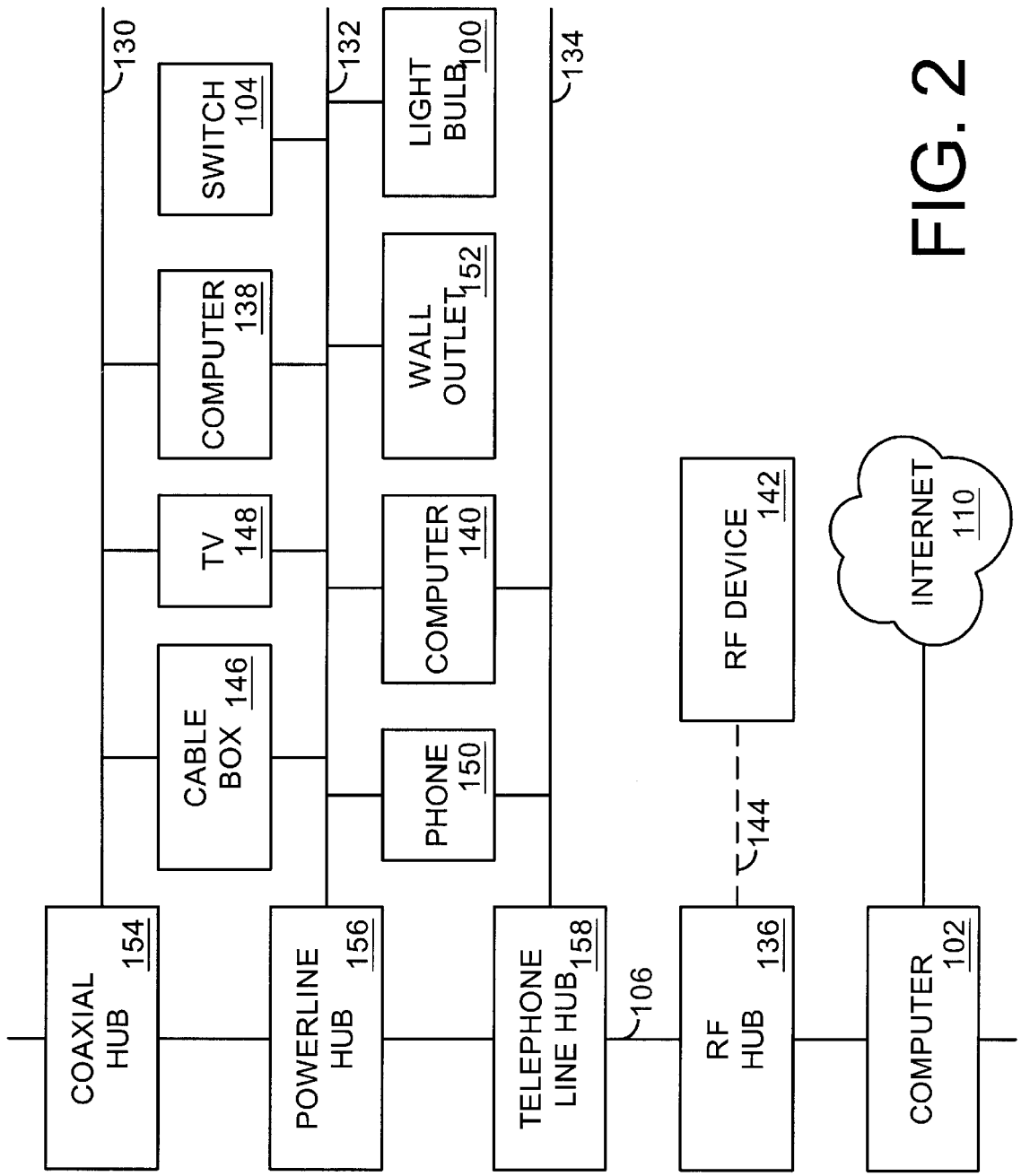
FIG. 2 illustrates one particular implementation of the FIG. 1 networking configuration.

FIG. 2 illustrates one particular implementation of the FIG. 1 networking configuration. Shown are the FIG. 1 exemplary minimally configured light bulb device 1 100, computer configuring device 2 102, and the "smarter" device 3 104 (e.g., a wall switch for the light bulb, where such switch includes a program for controlling other devices). As shown, the LAN cloud 106 has been presented as a combination of coaxial 130, power line 132, telephone line 134, and Radio Frequency 136 (RF) network backbones. Attached to these backbones 132–136 are traditional networking devices, such as computers 138, 140, and a RF device 142 (communication to the RF hub is represented by a dashed line 144). Non-traditional "augmented" devices include a cable converter box 146, television 148 (TV), telephone 150, as well as a wall outlet 152, light bulb 100 (from FIG. 1 example), and the switch 104.

Also shown are a coaxial hub 154, a power line hub 156, a telephone line hub 158, and a RF hub 136. As shown, these hubs (the term hub is used herein as a generic reference including routers, bridges, and other networking devices and the like) are used to convert between each hub's associated protocol and a common networking protocol (e.g., CEBus, TCP/IP, etc.) in use over the network 106. Protocol conversion is understood, and it is assumed herein that a transmission on one backbone propagates without error to other backbones.

Note that most devices are in communication with multiple network backbones. For example, since the computer 138 is in communication with both the coaxial backbone 130 and the power line backbone 132, devices can be designed to utilize both backbones. One reason for such a configuration is to provide fail-over network access. Another is to provide for different communication pathways depending on the nature of the communication desired. For example, a continuous low-speed status message may be sent over the power line backbone while high-speed communication sent over the coaxial network. (Not shown are relevant network interface cards for depicted devices.)

Figure 3:
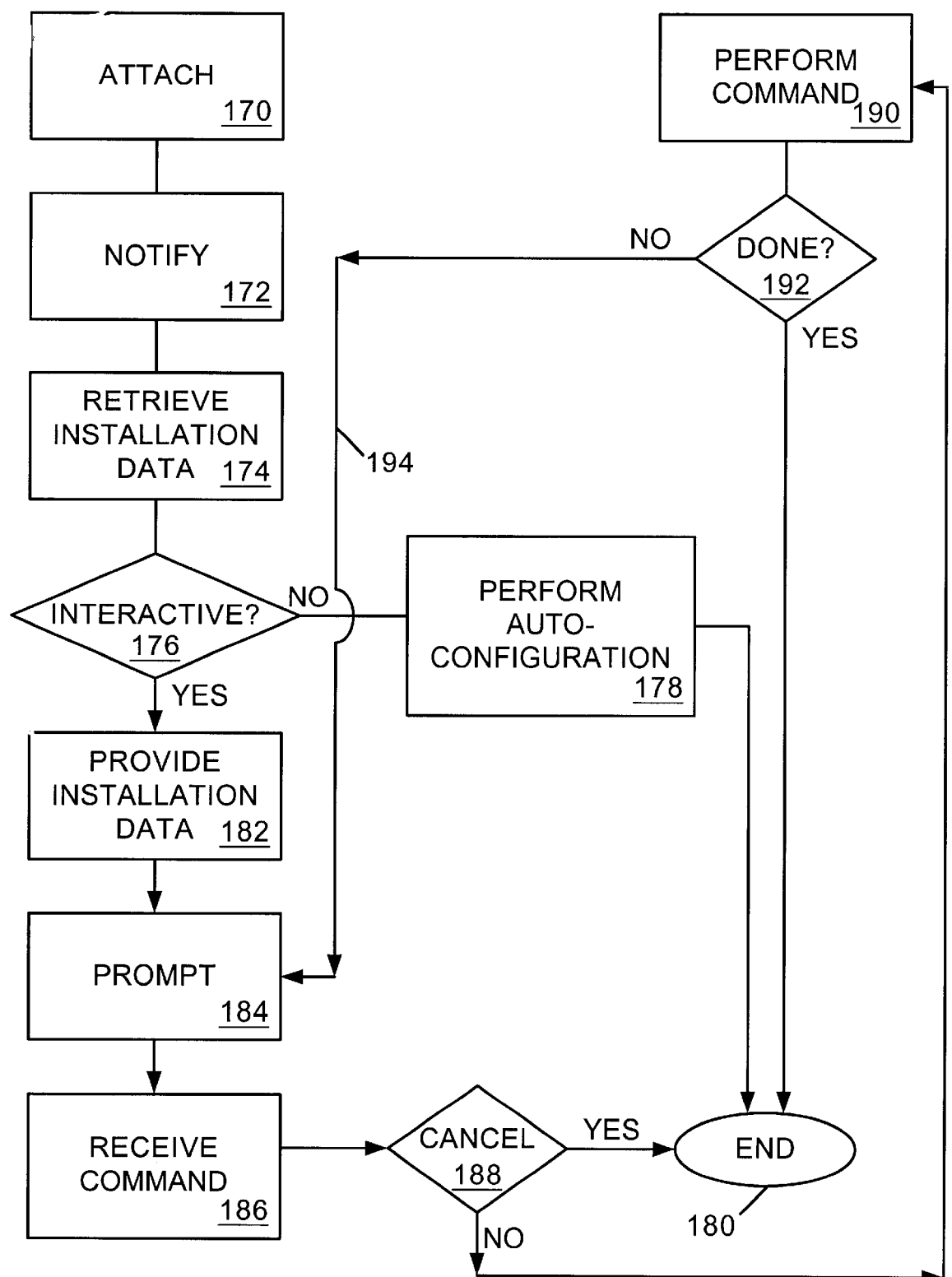
FIG. 3 is a flowchart for responding to an installation notification.

FIG. 3 is a flowchart for recognizing and responding to an installation notification for a device. In particular, it is assumed that a newly installed device is shipped to a consumer with little or no configuration directions (or such directions have been lost). As discussed below, installation, configuration and customization help can be automatically retrieved and provided to an installer. Note that although the following discussion is directed towards providing information to a person installing a certain device, the installer may be another device (e.g., computer 102 (FIG. 1) installing light bulb 100). Basic network communication is automatically handled without user intervention.

As shown, an initial step 170 is attaching a new device to the network. On attachment, an installation notification event is transmitted 172 to devices on the network with an embedded network interface (see, e.g., FIG. 1). (Alternatively, as shown in FIG. 2, a hub may recognize attachment of a device to a backbone, and initiate configuration of the device or direct a configuring device to configure the newly attached device.) Depending on the network configuration, the notification 172 can be broadcast to all devices on the network, or only to a specific subset or single device. For example, the network may be configured so that all notifications are sent to a central server, which then controls propagation of further notifications. (A broadcast generally refers to sending a message to a predetermined address, such as to address zero, where all devices know to listen to that address in addition to its assigned address.)

Figure 4:
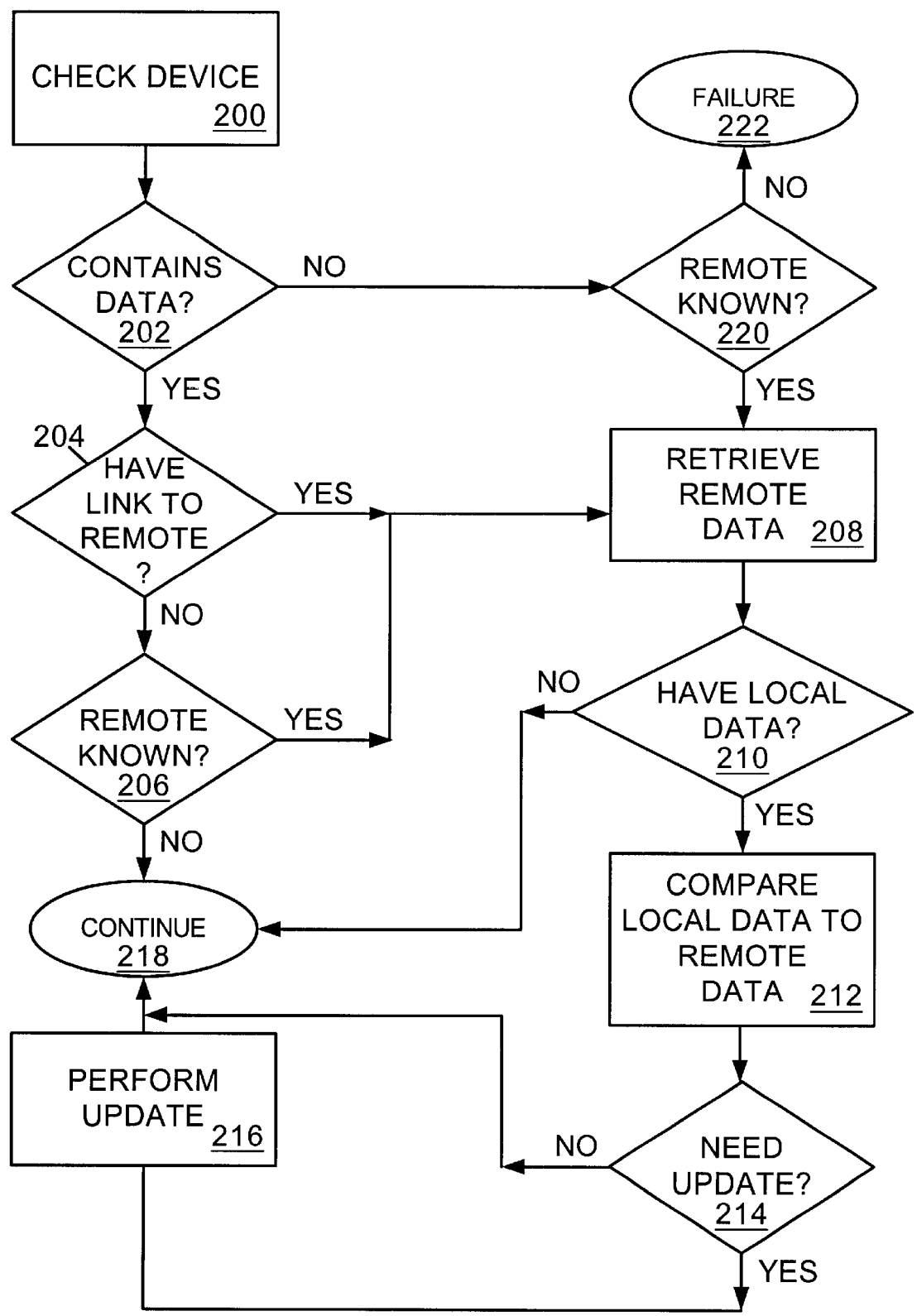
FIG. 4 is a flowchart for retrieval of a device configuration to aid in installation of a newly-installed device.

Assume that a Video Cassette Recorder (VCR) is being attached 170 to the network 106 (FIG. 1). On attachment to the coaxial network backbone 130 (FIG. 2), a notification event is broadcast to the network 106. In response a configuring device 102 (FIG. 1) retrieves 174 installation, configuration and customization data for the device. (FIG. 4 details block 174 operation.) Installation data typically includes how to further connect the device to other devices, e.g., proper wiring of sound system cables to, for example, a stereo and a television. Configuration information includes setting up basic operating modes; for the VCR, this would include information on how to set the VCR clock, antenna modes, closed-captioning, recognized channels, etc. And customization information generally includes setting user preferences; for the VCR, this can include color adjustment, sound modes, preferred channels, and the like.

After retrieval 174, a test 176 is performed to determine whether installation of the device is interactive. If not, auto-configuration 178 is performed. Non-interactive configuration can either mean that the device cannot be configured by a remote device, or that configuration can proceed without further user intervention. If the device cannot be remotely configured, then block 178 corresponds to simply displaying retrieved 174 install data to a user interface, e.g., to a web browser displayed by the configuring device 102. If the device can be remotely configured, then block 178 corresponds to the automatically performed configuration steps.

One way to implement auto-configuration 178 is to define, for each device, a configuration interface to which other devices can attach. The retrieved 174 installation data is provided to this interface. Installation data is formatted according in an interface language (e.g., a rule set) that describes required installation and configuration options for the device. A predetermined method will be used to query a device to determine such options. For example, each device can incorporate a mini web server for which a default home page contains the installation data. A device performing auto-configuration 178 can then query the device's mini web server, read the device installation and configuration requirements stored therein, and act accordingly.

Once auto-configuration 178 completes, configuration ends 180. Operative status, however, may not be immediate. For example, if a timer device were being installed, its operative status might be delayed until it can obtain a current time from a source clock.

If installation is determined interactive 176, i.e., if the exemplary VCR is being installed by a person, then the retrieved 174 installation, configuration and customization data is presented in a stepwise fashion to the configuring device's user interface. That is, after perhaps providing some initial installation instructions 182, the installer is then prompted 184 with a first configuration related item. In response, a configuration command 186 is received. Such commands include a request to set a certain device value, or acknowledgment of having performed a particular wiring installation requirement identified in the prompt, or a cancellation request. If 188 a cancel command is received, then configuration of the device ends 180.

As noted above, the user interface to the configuring device may be a computer terminal (or equivalent) providing an HTML interface. Thus, an HTML form can be displayed providing the prompt, and an entry field to enter a response (e.g., a command) to the prompt. Submission of the form causes the configuration command to be received.

If installation was not cancelled, the received command 186 is performed 190. Performance varies according to the command. For example, an acknowledgment simply generates the next installation step. Other commands typically update the state of the device 100, e.g., cause a writing to a configuration memory (e.g., 116, 118, 120 of FIG. 1) associated with the device.

After performing the command, a test 192 is performed to determine whether installation is complete. If so, then configuration ends 180. If installation is not complete, then processing continues 194 with prompting 184 with the next step of the installation process.

FIG. 4 is a flowchart for the retrieval process 174 (FIG. 3). When a device is being installed, the goal is to proved accurate and up-to-date installation, configuration and customization data to an installer (collectively referenced below as installation data). This data may be stored in a local memory associated with the installed device, in a remote network location, or at both locations. As noted below, a device may fail to provide local installation data or a link to remote installation data. In such circumstances, inspection of the device may yield a potential source for "generic" installation information.

Thus, when a retrieval is performed, the device being installed (e.g., the VCR) is inspected 200 to determine whether it has local built-in installation data. Such data may be stored in a portion of the device's configuration memory 116, 118, 120 (FIG. 1), or in another memory associated with the device. If there is local installation data, a check 204 is performed to determine whether the data includes a link to remote data. Remote data is located, if it exists, at a remote network location that is reachable over the remote public network 110 (FIG. 1). The remote data can contain installation, configuration, and customization data that augments or supplants local configuration data.

If 204 the device does not contain a reference to remote data, a second check 206 is performed to determine whether a remote location is already known (e.g., by the configuring device 102 (FIG. 1)). For example, a location for remote update data may have been created after the device was created, and thus no location is stored in the device. The configuring device, however, may contain a database cross-referencing devices with known remote locations. An inspection of the device's name, device id, or other characteristics can identify an appropriate remote location. If no location was already known, then processing continues 218.

If 204 there was a link to remote data, or such data was known 206, then the remote configuration information is retrieved 208 from its remote location. It is expected that an Internet web site or other network location contains information about the device. The benefit of having such a remote location is that up to date information can always be maintained at the remote location. In addition, devices can be designed with minimal configuration memories. That is, the configuration memory need only be large enough to store configurable options, and contain the link to the remote location. Retrieved data may then be presented to an installer as discussed above for FIG. 3.

However, larger devices may have the capacity for larger memories for storing local copies of installation data. Therefore, after retrieving the remote data, a check 210 is performed to determine if such local data is present.

If so, this local data is compared 212 against the remote data, to determine 214 whether the local data needs updating. If so, the out of date data is updated 216 with newer data (assuming the memory can be written). For example, configuration memory may include a device driver, and a comparison with remote data may indicate that the local device driver is several revisions out of date. The local data is then overwritten with the newer remote data, causing the local device driver to be updated.

Alternatively, if the installed device does not have a configuration memory, or is not revisable, a temporary memory in the retrieving device can be used to hold a retrieved updated configuration. Configuration of the device then operates from this temporary storage, ensuring an up to date installation.

If 214 there was no need for an update, then configuration processing continues 218. If 204 there was no link to remote data, and if 206 no location was already known 206, then processing continues 218.

Returning now to step 202, if the device does not contain local installation data, as in block 206 above, a second test is performed to determine 220 whether the location of remote configuration data is known. If remote data is known, then the remote data is retrieved 208 and processed as discussed above. However, if there is no local installation data, and there is no known remote installation data, then configuration fails 222.

Figure 5:
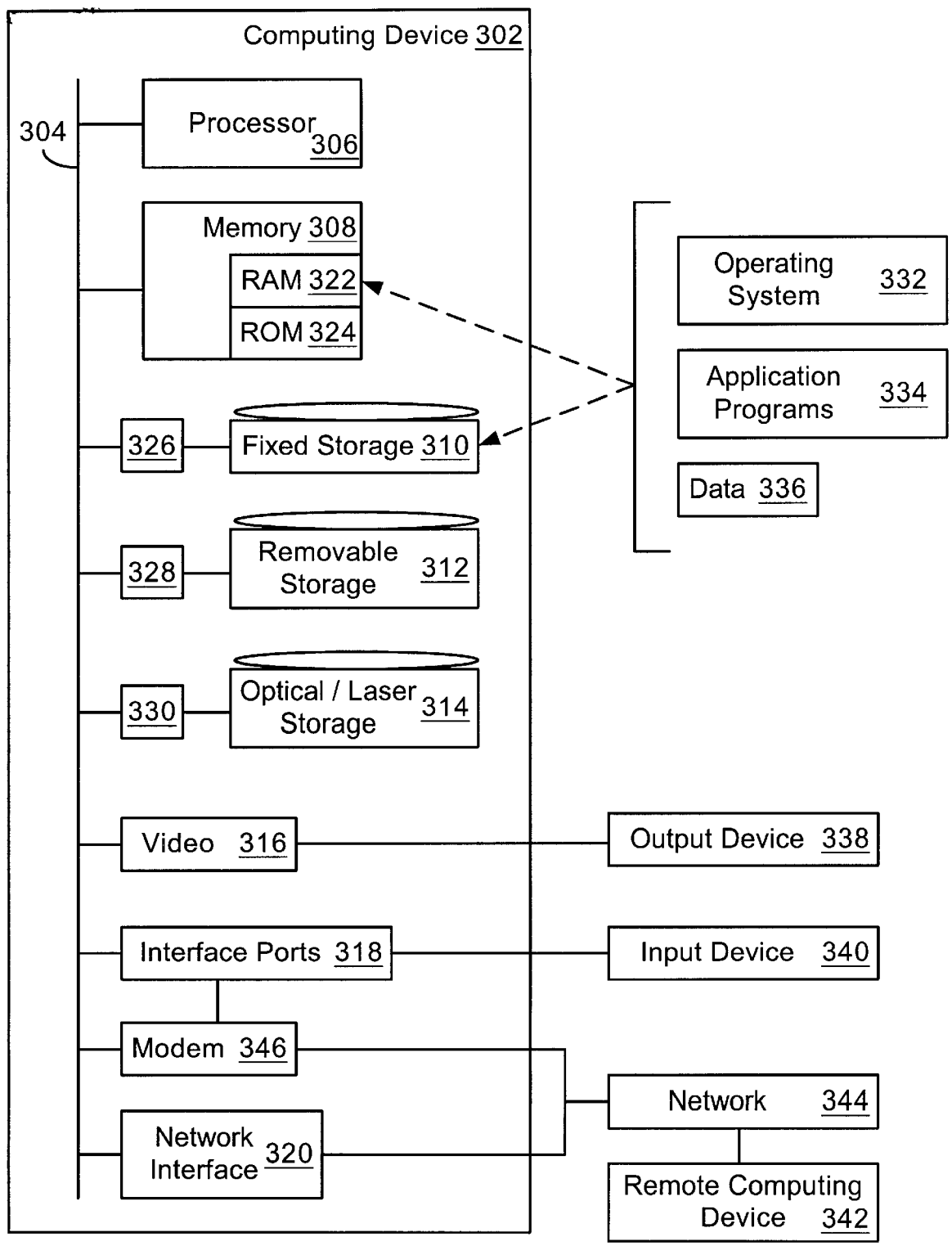
FIG. 5 shows an example operating environment for a configuring device.

FIG. 5 and the following discussion are intended to provide a brief, general description of a suitable computing environment for the configuring device 102 (FIG. 1). However, one skilled in the art will recognize that the other devices disclosed herein (e.g., device 1 100 and device 3 104) may include some or all components discussed below.

Portions of the invention may be described by reference to different high-level program modules and/or low-level hardware contexts. Those skilled in the art will realize that program module references can be interchanged with low-level instructions. Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the configuring device includes a computing device 302 having system bus 304 for coupling together various components within the computing device. The system 304 bus may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 304 are a processor 306, a memory 308, storage devices (e.g., fixed 310, removable 312, optical/laser 314), a video interface 316, input/output interface ports 318, and a network interface 320.

The processor 306 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 322, and static or re-programmable read only memory (ROM) 324. A basic input/output system (BIOS), stored in ROM, contains routines for information transfer between device 302 components or device initialization.

The fixed storage 310 generally refers to hard drive and other semi-permanently attached media, whereas removable storage 312 generally refers to a device-bay into which removable media such as a floppy diskette is removably inserted. The optical/laser storage 314 include devices based on CD-ROM, DVD, or CD-RW technology, and are usually coupled to the system bus 304 through a device interface 326, 328, 330. The storage systems and associated computer-readable media provide storage of data and executable instructions for the computing device 302. Note that other storage options include magnetic cassettes, tapes, flash memory cards, memory sticks, digital video disks, and the like.

The exemplary computing device 302 can store and execute a number of program modules within the RAM 322, ROM 324, and storage devices 310, 312, 314. Typical program modules include an operating system 332, application programs 334 (e.g., a web browser or network application program), etc., and application data 336. Program module or other system output can be processed by the video system 316 (e.g., a 2D and/or 3D graphics rendering device), which is coupled to the system bus 304 and an output device 338. Typical output devices include monitors, flat-panels displays, liquid-crystal displays, and recording devices such as video-cassette recorders.

A user of the computing device 302 is typically a person interacting with the computing device through manipulation of an input device 340. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 302 is expected to operate in a networked environment using logical connections to one or more remote computing devices. One such remote computing device 342 may be a web server or other program module utilizing a network application protocol (e.g., HTTP, File Transfer Protocol (FTP), Gopher, Wide Area Information Server (WAIS)), a router, a peer device or other common network node, and typically includes many or all of the elements discussed for the computing device 302. The computing device 302 has a network interface 320 (e.g., an Ethernet card) coupled to the system bus 304, to allow communication with the remote device 342. Both the local computing device 302 and the remote computing device 342 can be communicatively coupled to a network 344 such as a WAN, LAN, Gateway, Internet, or other public or private data-pathway. It will be appreciated that other communication links between the computing devices, such as through a modem 346 coupled to an interface port 318, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 306 of electrical signals representing data bits which causes a resulting transformation or reduction of the electrical signal representation, and the maintenance of data bits at memory locations in the memory 308 and storage systems 310, 312, 314, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of my invention with reference to an illustrated embodiment, it will be recognized that the illustrated embodiment can be modified in arrangement and detail without departing from such principles.

For example, while the foregoing description focused—for expository convenience—on device communication over primarily local networks, and provision of device-specific installation information to a display device, it will be recognized that the same techniques and analyses can be applied to arbitrary networks. In view of the wide variety of networks, which can be based on home power lines, telephone lines, networking wiring, broadcast technology, or some other technology, the detailed embodiments are intended to be illustrative only, and should not be taken as limiting the scope of the invention. Rather, what is claimed as the invention, is all such modifications as may come within the scope and spirit of the following claims and equivalents thereto.

What is claimed is:

1. A method for providing device-specific help information for a network-attachable device, comprising:
    receiving a connection notification for the network-attachable device over a first data path;
    retrieving a device-specific help information for the network-attachable device over a second data path in communication with a first memory associated with the network-attachable device, such memory containing device-specific help data; and
    providing the device-specific help information to a configuration interface providing access to the device-specific help information.

2. A method according to claim 1, further comprising:
    wherein the first data path is in communication with a private-access network, and the second data path is in communication with a public-access network.

3. A method according to claim 1, further comprising:
    wherein the first memory is a selected one of ROM, PROM, EPROM, flash memory, magnetically-recordable computer-readable media, and optically-recordable computer-readable media.

4. A method according to claim 1, in which device-specific help information has associated version data, and the retrieved device-specific help from the second data path is a first device-specific help, the method further comprising:
    retrieving a second device-specific help information from the public-access network over a third data path;
    comparing version data for the first and second device-specific help information; and
    if the first device-specific help information has an older version than the second device-specific help information, then updating the first information with the second information.

5. A method according to claim 1, further comprising:
    retrieving a characteristic profile for the network-attachable device, such profile including at least one interface for controlling operation of the network-attachable device.

6. A method according to claim 5, further comprising:
    configuring a control device to perform automatic control of the network-attachable device through the at least one interface;
    wherein the characteristic profile includes an interface description formatted according to an interface description language, such language indicating functionality of controls available through the at least one interface.

7. A method according to claim 6, further comprising:
    maintaining a manifest of devices attached to the first data path; and
    providing a concordance between manifest entries and device-specific help information for such devices attached to the first data path.

8. A method according to claim 7, further comprising:
    receiving a disconnect notification from the network-attachable device over the first data path; and
    secluding, in response to the disconnect notification, the network-attachable device from the manifest.

9. A method according to claim 1, in which the configuration interface is incorporated into a graphical user interface for configuring network-attachable devices, the method further comprising:
    displaying the device-specific help information on a display;
    selecting a configurable option of the network-attachable device;
    modifying the configurable option; and
    committing modifications to cause an update to the device-specific help information.

10. A method according to claim 1, further comprising:
    maintaining a manifest of devices attached to the first data path; and
    providing a concordance between an entry on the manifest and device-specific help information.

11. A method according to claim 10, further comprising:
    receiving a disconnect notification from the network-attachable device over the first data path; and
    secluding, in response to the disconnect notification, the network-attachable device from the manifest.

12. A method according to claim 1, in which the characteristic interface includes an input and an output for configuring the network-attachable device, the method further comprising:
    outputting the device-specific help information to the output;
    receiving a configuration command from the input; and
    updating the device-specific help information according to the configuration command.

13. A method according to claim 12, wherein updating the device-specific help information includes:
    storing such modified device-specific help information in a local configuration memory for the network-attachable device.

14. A method for configuring a removably-attachable network device in communication with a private network, such private network in communication with a public network, the method comprising:

receiving a connection notification over the private network from a newly-attached device having a configuration interface;

adding an entry to a manifest tracking connection notifications, such entry including an identifier for the newly-attached device;

providing an interface for inspecting and selecting each manifest entry;

retrieving a configuration profile for an attached device corresponding to a selected manifest entry, said retrieving including accessing a remote configuration profile from a remote memory associated with the attached device, such remote memory accessed over the public network; and storing at least a portion of the configuration profile by way of the configuration interface.

15. A method according to claim 14, wherein the operation of retrieving the configuration includes the operation of:

retrieving a local configuration profile from a local memory associated with the attached device, such local memory accessed over the private network;

wherein the local configuration includes a network location indicator identifying a location on the public network from which the remote configuration can be retrieved.

16. A method according to claim 14, in which configuration profiles are formatted in a web-browser format, and wherein the interface is a web-browser.

17. An article of manufacture, comprising a readable medium having programming instructions encoded thereon capable of causing a processor to perform the operations of:

receiving a connection notification for the network-attachable device over a first data path;

retrieving a device-specific help information for the network-attachable device over a second data path in communication with a first memory associated with the network-attachable device, such memory containing device-specific help data; and providing the device-specific help information to a configuration interface providing access to the device-specific help information.

18. The medium of claim 17, further comprising:

wherein the first data path is in communication with a private-access network, and the second data path is in communication with a public-access network.

19. The medium of claim 17, further comprising:

wherein the first memory is a selected one of ROM, PROM, EPROM, flash memory, magnetically-recordable computer-readable media, and optically-recordable computer-readable media.

20. The medium of claim 17, in which device-specific help information has associated version data, and the retrieved device-specific help from the second data path is a first device-specific help, said programming instructions including further instructions for:

retrieving a second device-specific help information from the public-access network over a third data path;

comparing version data for the first and second device-specific help information; and if the first device-specific help information has an older version than the second device-specific help information, then updating the first information with the second information.

21. The medium of claim 17, said programming instructions including further instructions for:

retrieving a characteristic profile for the network-attachable device, such profile including at least one interface for controlling operation of the network-attachable device.

22. The medium of claim 21, said programming instructions including further instructions for:

configuring a control device to perform automatic control of the network-attachable device through the at least one interface; and including an interface description, formatted according to an interface description language, with the characteristic profile, such language indicating functionality of controls available through the at least one interface.

23. The medium of claim 22, said programming instructions including further instructions for:

maintaining a manifest of devices attached to the first data path; and providing a concordance between manifest entries and device-specific help information for such devices attached to the first data path.

24. The medium of claim 23, said programming instructions including further instructions for:

receiving a disconnect notification from the network-attachable device over the first data path; and secluding, in response to the disconnect notification, the network-attachable device from the manifest.

25. The medium of claim 17, in which the configuration interface is incorporated into a graphical user interface for configuring network-attachable devices, said programming instructions including further instructions for:

displaying the device-specific help information on a display;

selecting a configurable option of the network-attachable device;

modifying the configurable option; and committing modifications to cause an update to the device-specific help information.

26. The medium of claim 17, said programming instructions including further instructions for:

maintaining a manifest of devices attached to the first data path; and providing a concordance between an entry on the manifest and device-specific help information.

27. The medium of claim 26, said programming instructions including further instructions for:

receiving a disconnect notification from the network-attachable device over the first data path; and secluding, in response to the disconnect notification, the network-attachable device from the manifest.

28. The medium of claim 17, in which the configuration interface includes an input and an output for configuring the network-attachable device, said programming instructions including further instructions for:

outputting the device-specific help information to the output;

receiving a configuration command from the input; and updating the device-specific help information according to the configuration command.

29. The medium of claim 28, wherein said instructions for updating the device-specific help information includes further instructions for:

storing such modified device-specific help information in a local configuration memory for the network-attachable device.

30. An article of manufacture for configuring a removably-attachable network device, said article comprising a readable medium having programming instructions encoded thereon capable of causing a processor to perform the operations of:

receiving a connection notification over a private network from a newly-attached device having a configuration interface;

adding an entry to a manifest tracking connection notifications, such entry including an identifier for the newly-attached device;

providing an interface for inspecting and selecting each manifest entry;

retrieving a configuration profile for an attached device corresponding to a selected manifest entry, said retrieving including retrieving a remote configuration profile from a remote memory associated with the attached device, such remote memory accessed over the public network; and storing at least a portion of the configuration profile by way of the configuration interface.

31. The medium of claim 30, wherein said programming instructions for retrieving the configuration include further instructions for:

retrieving a local configuration profile from a local memory associated with the attached device, such local memory accessed over the private network;

wherein the local configuration includes a network location indicator identifying a location on the public network from which the remote configuration can be retrieved.

32. The medium of claim 30, in which configuration profiles are formatted in a web-browser format, and wherein the interface is a web-browser.

33. An article of manufacture, comprising a readable medium having programming instructions encoded thereon capable of causing a processor to perform the operations of:

receiving a connection notification for the network-attachable device over a first data path;

retrieving a device-specific help information for the network-attachable device over a second data path in communication with a memory associated with the network-attachable device, such memory containing device-specific help data; and providing the device-specific help information to a configuration interface of the network-attachable device, the configuration interface providing access to the device-specific help information.

34. The article of manufacture of claim 33, wherein said programming instructions include further instructions for:

maintaining a manifest of devices attached to the first data path;

associating manifest entries with device-specific help information;

receiving a disconnect notification from the network-attachable device over the first data path; and tracking the disconnect notification within the manifest.

35. A method comprising:

receiving a connection notification for the network-attachable device over a first data path;

retrieving a device-specific help information for the network-attachable device over a second data path in communication with a memory associated with the network-attachable device, such memory containing device-specific help data; and storing the device-specific help information in a memory associated with a configuration interface of the network-attachable device, the configuration interface providing access to the device-specific help information.

36. The method of claim 35, further comprising:

maintaining a manifest of devices attached to the first data path;

associating manifest entries with device-specific help information;

receiving a disconnect notification from the network-attachable device over the first data path; and tracking the disconnect notification within the manifest.

* * * * *